May 11, 1965  J. R. BEATTY ETAL  3,182,494
VISCUROMETER
Filed Oct. 17, 1962  2 Sheets-Sheet 1
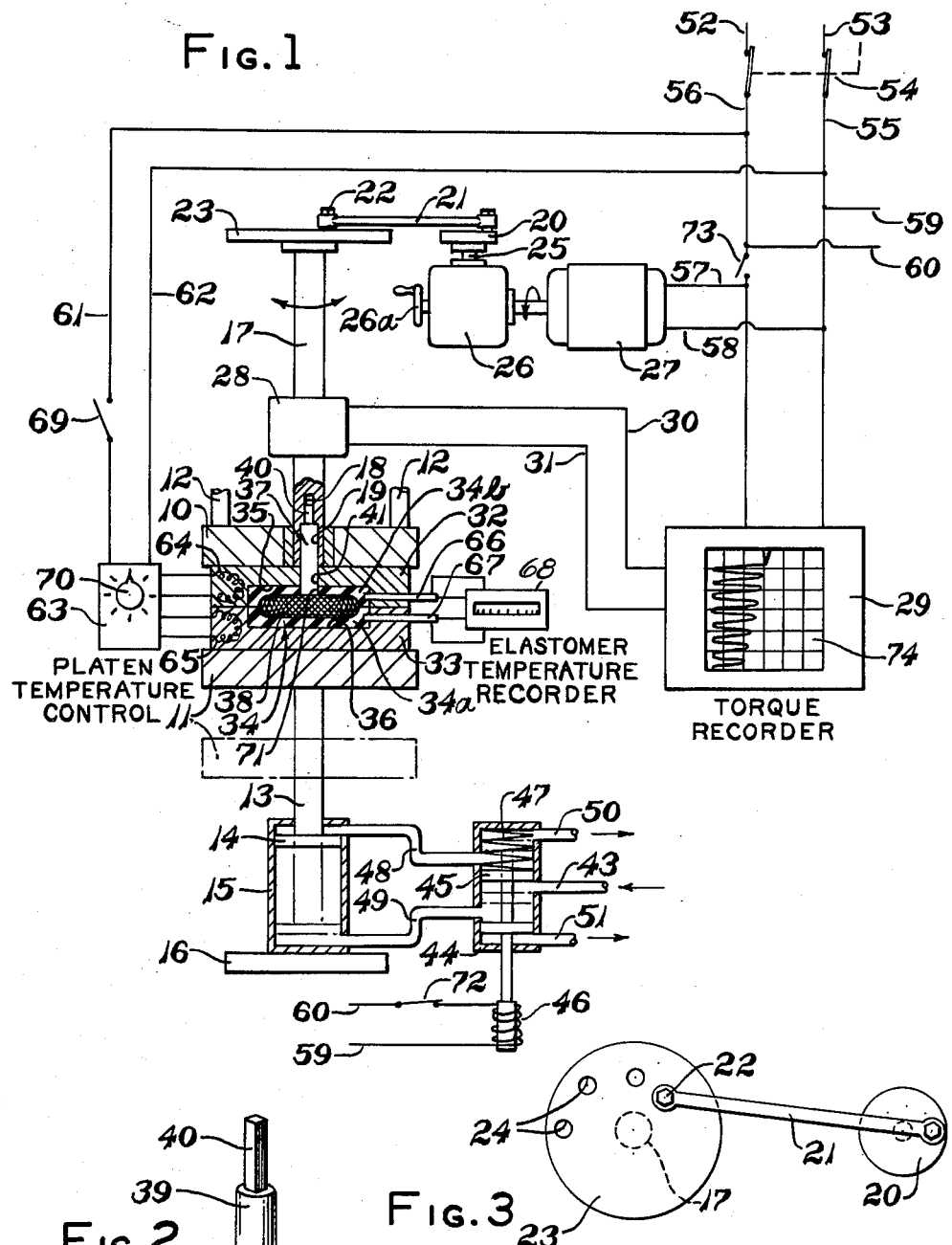
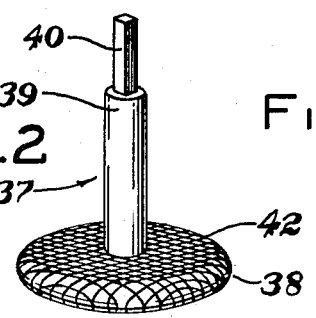
INVENTORS
JAMES R. BEATTY
ARTHUR E. JUVE
PAUL W. KARPER
BY William L Reeve
ATTY.

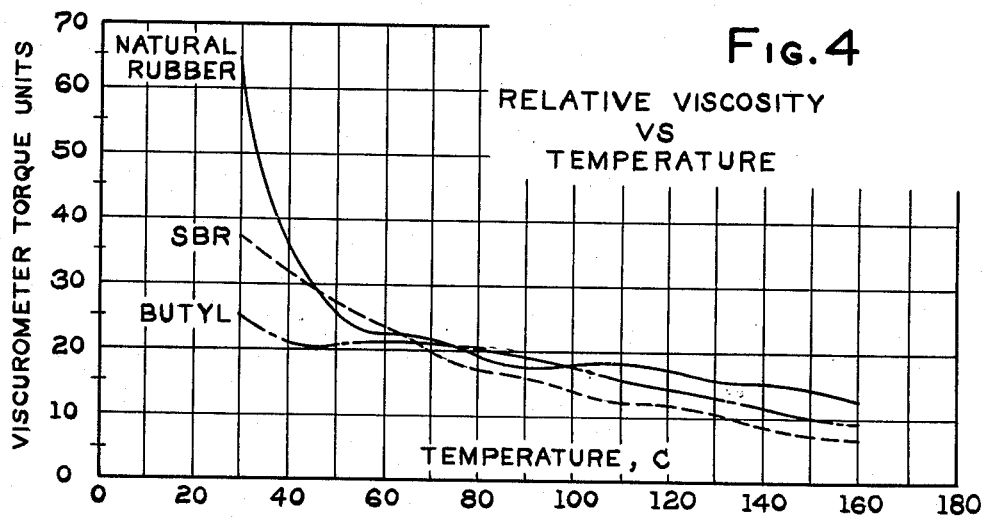
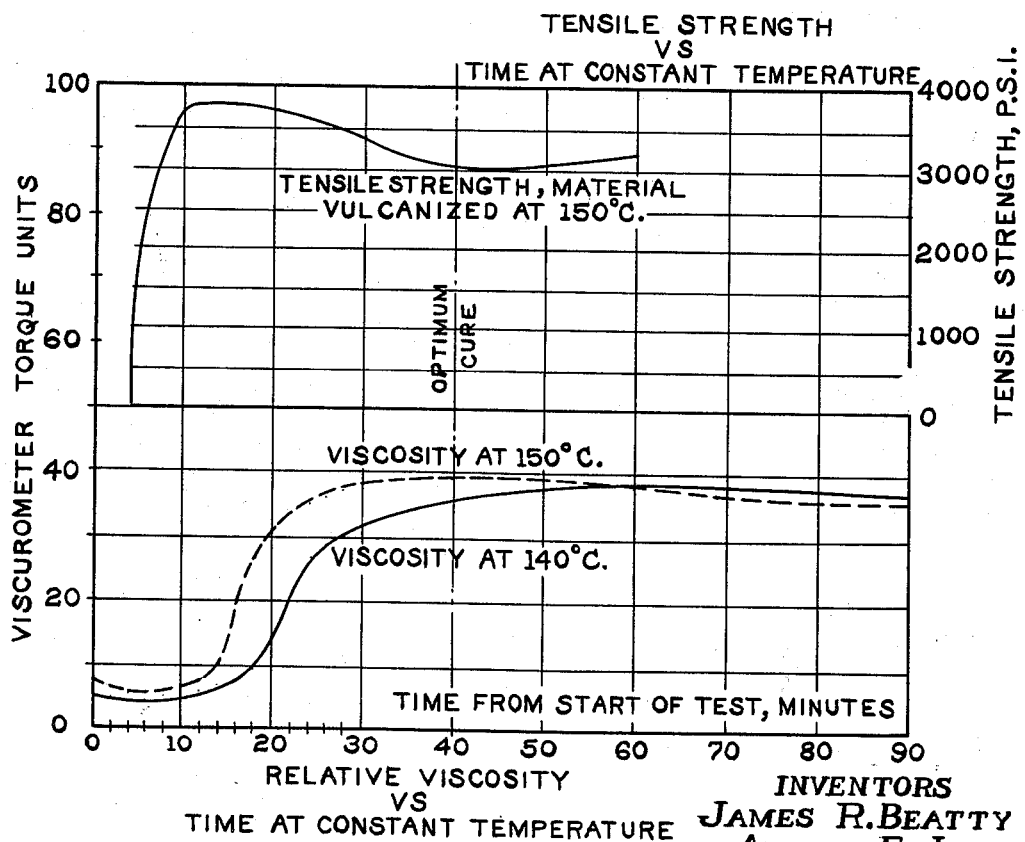
Fig. 5
INVENTORS
JAMES R. BEATTY
ARTHUR E. JUVE
PAUL W. KARPER
BY
ATTY.

United States Patent Office 3,182,494
Patented May 11, 1965

3,182,494
VISCUROMETER
James R. Beatty, Akron, Arthur E. Juve, Peninsula, and Paul W. Karper, Kent, Ohio, assignors to The B. F. Goodrich Company, New York, N.Y., a corporation of New York
Filed Oct. 17, 1962, Ser. No. 231,191
11 Claims. (Cl. 73—101)

This invention relates to the field of testing devices and, more specifically, it pertains to a method and apparatus for determining the viscosity and related characteristics of raw or compounded elastomeric materials, either vulcanizable or nonvulcanizable, and reclaimed elastomeric material.

In day-to-day manufacturing service problems, as well as in the performance of theoretical studies involving the use of elastomeric materials it is necessary to determine the rate and extent of vulcanization, or cure, of these materials as a function of time and temperature, as well as their initial viscosity. For example, in the manufacture of such articles as hose it is necessary that the product development engineer be completely familiar with the scorch and optimum cure times of his tube compound at various temperatures in order to control the heat history of the compound within safe processing limits. Scorch time as used herein refers to the time for the onset of cure at a given temperature, while by optimum cure time is meant the time to cure the compound at a given temperature to give some optimum physical property. With such knowledge, the engineer can judiciously establish a method of fabricating his hose tube by extrusion or calendering of the material, or a combination thereof, and also decide upon a suitable temperature and time for vulcanization of the finished product. The engineer may also be faced with the problem of vulcanizing a product having an extremely heavy cross-section. In order to insure adequate penetration of vulcanization heat to the innermost portions of the product it may be necessary to vulcanize for a time considerably greater than that necessary to reach an optimum cure in the material forming the outer portions of the product. In such case the engineer must be aware of the tendency of the outer portions of the compound to deteriorate either by softening or stiffening excessively as vulcanization continues beyond the optimum cure time.

Furthermore, in the theoretical studies of compounding new vulcanizable elastomeric materials it is frequently desirable to determine the effect of an individual compounding ingredient on the viscosity, scorch time, rate of cure, optimum cure time and reversion tendencies of the parent compound. In the past these measurements have, of necessity, been made using a combination of devices. The Mooney Viscometer used in accordance with the American Society for Testing Materials' tentative method of test, designation D1646–59T, measures scorch quite well and also measures the initial viscosity, but does not predict time to optimum cure accurately, nor is it capable of providing cure reversion information due to the tearing of the sample in the area of the rotor periphery as cure progresses. On the other hand, stress-strain tests on a great number of cured test samples can predict optimum cure and indicate reversion characteristics but cannot give scorch or viscosity characteristics. With the increasing emphasis on and demand for a greater number of superior elastomeric materials it has become a necessity for the engineer to have at his disposal, in a single piece of test apparatus, a means for forecasting quickly and accurately the performance of a given compound over the span of its heat history without the necessity of using a large number of test samples.

It is an object of this invention, therefore, to provide a method for determining the viscosity of elastomeric materials.

It is another object of this invention to provide a method for the determination of the scorch tendencies of vulcanizable elastomeric materials.

It is a further object of this invention to provide a method for the determination of the optimum cure for vulcanizable elastomeric materials.

It is a still further object of this invention to provide a method for determining the cure reversion tendencies of vulcanizable elastomeric materials.

It is a still further object of this invention to provide an apparatus whereby all of the foregoing objects may be accomplished.

Further objects and advantages to be gained from the present invention will be apparent to those skilled in the art to which it pertains from the following description of the preferred embodiment of the apparatus for carrying out the objects of the invention and from the drawings forming part of this application in which:

FIG. 1 is a somewhat schematic, front elevational view of the apparatus, partially in section, illustrating the relationship of various control elements in the apparatus;

FIG. 2 is a perspective view of the test rotor;

FIG. 3 is a plan view of the connection between the drive wheels for oscillating the test rotor;

FIG. 4 is a reproduction of a typical relative viscosity curve, obtainable through use of the present invention, for a group of uncompounded elastomeric materials; and FIG. 5 is a reproduction of vulcanization curves for a given compound at two different test temperatures obtained through the use of the apparatus illustrated in FIG. 1, as well as the tensile strength curve for the same compound vulcanized at one temperature.

APPARATUS STRUCTURE

The apparatus for carrying out the method of the invention is shown schematically in a preferred embodiment in FIG. 1 as comprising a pair of platens 10 and 11. Platen 10 is rigidly mounted to an overhead structure, not shown, by means of vertical supports 12. Platen 11 is mounted on the end of a vertical piston rod 13 which is attached to a piston 14 movable within a double acting fluid pressure cylinder 15, which is mounted on a base plate 16. Thus, as piston 14 moves within its cylinder 15, platen 11 may be moved toward or away from platen 10. Rotatably journalled in the central portion of platen 10, and vertically perpendicular thereto, is a shaft 17. At the lower end of shaft 17 is a coaxial passageway 18 of square cross-section, cylindrically countersunk as at 19. At the upper end of shaft 17 is mounted a wheel member 23. One end of a crank arm 21 is pivotally mounted, by means of a removable pin 22, to wheel 23. As seen in FIG. 3, wheel 23 has a plurality of pin receiving index holes 24, each at a different radial spacing from the vertical axis of wheel 23. An eccentric drive wheel 20 is mounted on the output shaft 25 of a variable speed reducer 26 driven by a motor 27, and the other end of crank arm 21 is pivotally mounted thereto. Thus, as motor 27 is operated to rotate eccentric drive wheel 20, wheel 23 and shaft 17 are rotatably oscillated, the amplitude of said oscillation dependent upon the particular mounting of pin 22 in the index holes 24 of wheel 23, and the frequency of oscillation dependent upon the output speed of reducer 26 as controlled by handwheel 26a.

Mounted about shaft 17 is a torque sensing pickup device 28 which responds to torsion forces in shaft 17 to actuate a torque recorder 29 through electrical lines 30 and 31. The pickup device 28 may comprise a bonded resistance wire strain gauge, well known in the art and therefore neither illustrated nor described in detail, in which the wire gauges are bonded to the shaft 17 in such a position, and are so connected into a bridge circuit, that they cancel the effects of bending and thrust strains while adding the effects of torsional strains, with the relation between bridge unbalance and torsional strain being exactly linear. A pickup device such as this is manufactured by the Baldwin-Lima-Hamilton Corporation, located in Waltham, Massachusetts, and is known as their type B torque pickup which has a nominal output of 1.5 mv. per volt input.

Removably supported upon lower platen 11 is a pair of die members 32, 33 for confining elastomeric material 34 to be tested in the apparatus. Each member 32 and 33 has formed therein a shallow, cylindrical material confining chamber, 35 and 36 respectively. A material shearing member 37 having a disc-like portion 38 is provided with a cylindrical shank 39 having an extension 40 of square cross-section for cooperation with passageway 18 in shaft 17. In use, the disc portion 38 is centered within the material 34 in cavities 35 and 36 and the shank portion 39 extends through a central passageway 41 in die member 32. The upper and lower faces of the disc portion 38 are serrated, as at 42 for frictional engagement with the surrounding elastomeric material 34. The peripheral edge is rounded to prevent tearing of the material 34, and knurled to prevent slippage.

APPARATUS CONTROLS

Although it will be appreciated that the various individual control circuits may be so arranged and interconnected as to provide fully automatic operation of the apparatus in a manner well understood in the art and forming no part of this invention, for purposes of clarity they have been shown in the drawings as more-or-less manually operated.

Fluid for moving piston 14 within its cylinder 15 is supplied from a source under elevated pressure, not shown, through supply line 43 to a four way, spring return solenoid valve 44, having a piston 45 moved either by the action of solenoid 46 or return spring 47. Fluid is either supplied to or exhausted from cylinder 15 by means of lines 48 and 49. Fluid exhausted from cylinder 15 passes through valve 44 to fluid exhaust lines 50 or 51.

Electrical power for control operation is supplied by electric lines 52 and 53 which are connected to a source of electrical power not shown. A double pole, single throw switch 54 connects lines 52 and 53 to main control lines or bus bars 55 and 56 which lead to the torque recorder 29. Lines 57 and 58 connect motor 27 to lines 56 and 55, respectively. Lines 59 and 60 supply power to the solenoid 46, while lines 61 and 62 supply power to a platen temperature control unit 63 which, in turn, is connected to heating coils 64 and 65 embedded in the upper and lower die members 32 and 33, respectively. Also embedded in members 32 and 33 are thermocouples 66 and 67 which protrude into the chambers 35 and 36 to sense the temperature of the material 34 confined therein. These thermocouples are connected to a temperature recorder 68.

OPERATION

In performing tests with the apparatus described above, the operator preheats die members 32 and 33 by closing the main control switch 54, and switch 69 located in line 61 and setting a control knob 70 on the temperature control unit 63 for the desired temperature. The operator then takes two equal discs 34a and 34b of the material 34 to be tested. A hole 71 is punched in disc 34b to accommodate the shank 39 of the shearing member 37. Discs 34a and 34b are placed in chambers 36 and 35, respectively and the shank of member 37 is inserted through the hole in 34b and passageway 41 of member 32. The two die members 32 and 33 are then brought together, with the disc portion 38 of member 37 centered between the material discs 34a and 34b, and placed on lower platen 11. The operator then closes normally open switch 72 to energize solenoid 46 and thereby cause piston 14 to move to its position as shown in full line in FIG. 1 and to move platen 11 toward platen 10. As the platen 11 rises the operator guides the shearing member 37 in such a way that the square shank portion 40 properly engages the square passageway 18 in shaft 17. One minute after the platens are closed the operator closes switch 73 to energize motor 27, thereby causing shearing member 37 to rotatably oscillate within the material 34. As member 37 oscillates in each direction, the shearing forces over the surface of disc portion 38 are transmitted to shaft 17 where they are sensed as torque by the torque senser 28 and thereby recorded as torque units by the torque recorder 29 as a graph on a moving chart 74.

It will be seen that by varying the frequency of the oscillations of shearing member 37, the amplitude by means of changing the setting of pin 22 in the index holes 24 of wheel 23, the size of member 37, the temperature, or various combinations thereof, a great number of useful and informative test results may be obtained, as seen in the examples which follow.

Example 1

Discs of various uncompounded elastomeric materials were placed in the die chambers 35 and 36 using a shearing member 37 having a disc portion 38, 0.218 inch in thickness, an outside diameter of 1½ inches, and having a peripheral edge curved to a radius of 0.109 inch. The reducer 26 and the position of pin 22 in wheel 23 were adjusted to rotatably oscillate shaft 17 and member 37 at a rotary speed equivalent to 2 revolutions per minute, or 12° per second, with an amplitude of 90°. Before rotating member 37 the material 34 was allowed to reach an initial temperature of 30° C. At this temperature, oscillation of member 37 was initiated and readings were taken from chart 74 at 10° C. increments as the temperature was raised at a uniform rate of approximately 2° C. per minute. The following data was obtained, forming the basis for the curves of FIG. 4, the units expressed being viscurometer torque units, one viscurometer unit equaling approximately 2.79 inch pounds:

| Temp., °C. | Natural Rubber | SBR | Butyl |
| --- | --- | --- | --- |
| 30 | 65.0 | 37.0 | 25.0 |
| 40 | 36.5 | 32.0 | 21.0 |
| 50 | 25.8 | 27.0 | 20.5 |
| 60 | 22.4 | 23.5 | 21.0 |
| 70 | 21.4 | 20.0 | 20.6 |
| 80 | 19.3 | 17.5 | 20.0 |
| 90 | 17.5 | 15.8 | 19.0 |
| 100 | 17.8 | 14.0 | 17.5 |
| 110 | 17.8 | 12.5 | 15.5 |
| 120 | 17.5 | 11.5 | 14.0 |
| 130 | 16.6 | 10.5 | 13.0 |
| 140 | 16.0 | 9.0 | 11.5 |
| 150 | 14.5 | 8.0 | 10.0 |
| 160 | 13.3 | 7.5 | 9.4 |

Thus, it may be seen that through the use of the apparatus of the present invention the relative viscosities of various elastomeric materials are easily obtainable over a wide temperature spectrum.

Example 2

Using the same apparatus components as used in Example 1, and with the same rate of oscillation of member 37, but with an amplitude of 22½°, vulcanization data was obtained on a test compound known in the art as ASTM 2A, and having the following recipe:

| Material: | Parts by weight |
| --- | --- |
| Natural rubber | 100.0 |
| Zinc oxide | 5.0 |
| Sulphur | 2.5 |
| Stearic acid | 1.0 |
| Phenyl beta-naphthylamine | 1.0 |
| Benzothiazyldisulfide | 1.0 |

Before oscillating member 37 the compound was allowed to heat for one minute while confined within the die members 32 and 33 which were at a temperature of 140° C., and which temperature was maintained for the duration of the test. The following data, uncorrected for thermal lag, taken from chart 74 at 2 minute intervals, except for the latter portion of the test period when data is shown at 10 minute intervals, forms the basis for one of the compound vulcanization curves in FIG. 5:

| Time from start, minutes | Viscurometer torque units |
|---|---|
| 0 | 6.6 |
| 2 | 5.2 |
| 4 | 4.6 |
| 6 | 4.6 |
| 8 | 5.0 |
| 10 | 5.1 |
| 12 | 5.6 |
| 14 | 6.5 |
| 16 | 7.6 |
| 18 | 9.3 |
| 20 | 14.5 |
| 22 | 21.7 |
| 24 | 25.6 |
| 26 | 28.0 |
| 28 | 30.0 |
| 30 | 31.5 |
| 40 | 35.6 |
| 50 | 37.2 |
| 60 | 37.5 |
| 70 | 37.5 |
| 80 | 37.0 |
| 90 | 36.9 |

*Example 3*

The compound and test conditions of Example 2 were the same except that the temperature of the die chambers 32 and 33 were maintained at 150° C. during the test. The following data was obtained in that test to form the basis for the other curve of FIG. 5:

| Time from start, minutes | Viscurometer torque units |
|---|---|
| 0 | 8.0 |
| 2 | 6.0 |
| 4 | 5.0 |
| 6 | 5.0 |
| 8 | 5.3 |
| 10 | 6.2 |
| 12 | 7.5 |
| 14 | 10.0 |
| 16 | 20.5 |
| 18 | 27.0 |
| 20 | 30.8 |
| 22 | 33.0 |
| 24 | 34.8 |
| 26 | 36.2 |
| 28 | 37.3 |
| 30 | 38.2 |
| 40 | 38.8 |
| 50 | 38.1 |
| 60 | 37.5 |
| 70 | 37.0 |
| 80 | 36.8 |
| 90 | 36.6 |

It has been found that one viscurometer torque unit equals approximately 3.79 units in the Mooney scale when approximately 12 volts of direct current, from a source not shown, are supplied to the torque senser device 28; therefore, all of the standard scorch information may be obtained from the data as developed in Examples 2 and 3. It will be seen, however, that the apparatus of the present invention makes possible a method whereby the optimum cure and the reversion tendencies for various compounds may be found. This is indicated by the tensile strength curve at 150° C. for the test material shown in FIG. 5. It will be seen in the standard tensile strength test that optimum cure is reached after vulcanization for approximately 40 minutes at a temperature of 150° C. This closely matches the flattening of the viscurometer curve at this temperature, which flattening indicates optimum cure.

It will be appreciated that although this invention has been described with reference to a specific embodiment of the apparatus thereof, and to specific examples of the method thereof, changes and modifications, readily apparent to those skilled in the art to which it pertains, may be made thereto within the spirit and scope of the invention as defined in the appended claims.

We claim:

1. A method for the determination of the relative viscosity of solid elastomeric material, comprising confining a sample of the material under pressure, subjecting the confined material to oscillating rotary shearing forces at a predetermined constant rate and of predetermined constant amplitude and measuring the torsional resistance to these shearing forces.

2. A method for the determination of the relative viscosity of solid elastomeric material, comprising confining a sample of the material under pressure, subjecting the confined material to internal oscillating rotary shearing forces at a predetermined constant rate and of predetermined constant amplitude of 90° or less, and measuring the torsional resistance to the shearing forces.

3. A method for the determination of the effects of temperature on the viscosity of a vulcanizable elastomeric material, comprising confining a sample of said material under pressure, heating said confined sample to a predetermined temperature, subjecting the confined heated material to internal oscillating rotary shearing forces imposed at a predetermnied constant rate and of predetermined constant amplitude while maintaining the sample at the same temperature, and measuring the torsional resistance to these shearing forces.

4. A method of determining physical properties of solid elastomeric material comprising embedding a rotor in a quantity of the material, rotatably oscillating the rotor about its axis at a predetermined constant rate through a predetermined arc of constant predetermined amplitude less than that which causes tearing of the material while maintaining the material in contact with the rotor, and measuring the torsional resistance of said rotor to oscillation.

5. A method of determining physical properties of solid elastomeric material comprising embedding a rotor in a quantity of the material, rotatably oscillating the rotor about its axis through an arc of constant predetermined amplitude not exceeding 90° at a predetermined rate in the order of 12° per second while maintaining the material in contact with the rotor, and measuring the torsional resistance of said rotor to oscillation.

6. A method for determining the effects of temperature on a solid vulcanizable elastomeric material, comprising confining an unvulcanized sample of said material under pressure, raising the temperature of said confined sample at a predetermined uniform rate to at least the vulcanizing temperature of the sample, subjecting the confined heated material to continuous internal rotary oscillating shearing forces imposed throughout the increase in temperature at a predetermined constant rate and of predetermined constant amplitude less than that which causes tearing of the material, and measuring the torsional resistance to the shearing forces developed at least during the time in which increase in temperature of the sample occurred.

7. A method for determining the effects of temperature on a solid vulcanizable elastomeric material comprising embedding a rotor in a quantity of the unvulcanized material, rotatably oscillating the rotor about its axis through an arc of predetermined constant amplitude and at a predetermined rate less than that which causes tearing of the material while maintaining the material in contact with the rotor, raising the temperature of the material at a predetermined uniform rate to at least the vulcanizing temperature of the material, and measuring the torsional resistance of said rotor to oscillation for a period of time at least inclusive of the time during which increase in temperature of the material occurred.

8. An apparatus for determining the viscosity of a solid elastomeric material comprising: material confining means including at least two separable portions defining a material confining chamber therebetween; means to move one of said portions against the other said portion and said material confined therebetween to exert pressure thereon; means to impose an oscillatory shearing force of predetermined constant amplitude in said material so confined including a rotor supported in said chamber, a drive shaft connected to said rotor and extending externally of the chamber, and drive means connected to said shaft for angularly oscillating the latter through an arc of predetermined constant amplitude less than a complete revolution; and means for measuring the force required to oscillate said rotor.

9. An apparatus as defined in claim 8 wherein the means to measure the force required to oscillate said rotor includes torque responsive means cooperating with said shaft and recorder means connected to said torque responsive means.

10. An apparatus for determining physical properties of solid vulcanizable elastomeric material comprising a pair of material confining die members defining a material confining chamber, means to move one of said die members to and from chamber defining engagement with the other of said die members, means to heat the said die members, means to indicate the temperature of the confined material, a rotor supported in said chamber in a position such that it is adapted to be surrounded by the material confined therein, a drive shaft connected to said rotor and extending externally of said die members, drive means connected to said shaft for rotatably oscillating the said rotor through an arc of predetermined constant amplitude less than a complete revolution, torque responsive means cooperating with said shaft to indicate variations in torque therein, and recording means connected to said torque responsive means.

11. An apparatus as defined in claim 10 wherein the said drive means includes means to convert rotary motion in one direction to arcuate oscillatory motion, and separate means to independently vary the rate and amplitude of the oscillating motion.

References Cited by the Examiner
UNITED STATES PATENTS

| | | | |
|---|---|---|---|
| 1,942,920 | 1/34 | Fawkes | 73—59 |
| 2,037,529 | 4/36 | Mooney | 73—101 |
| 2,354,923 | 8/44 | McNamee | 73—59 |
| 2,550,052 | 4/51 | Fay | 73—59 |
| 3,107,520 | 10/63 | Mouly | 73—60 |

RICHARD C. QUEISSER, Primary Examiner.